E. A. LE BEAU.
SIDE BEARING FOR RAILWAY CARS.
APPLICATION FILED MAR. 12, 1914.

1,139,543.

Patented May 18, 1915.

Witnesses:
J. Adolph Bishop
M. Smith

Inventor
Ernest A. LeBeau,
By J. M. Cornwall.
Atty.

UNITED STATES PATENT OFFICE.

ERNEST A. LE BEAU, OF CHICAGO, ILLINOIS, ASSIGNOR TO CHICAGO RAILWAY EQUIPMENT COMPANY, OF CHICAGO, ILLINOIS, A CORPORATION OF ILLINOIS.

SIDE BEARING FOR RAILWAY-CARS.

1,139,543.   Specification of Letters Patent.   Patented May 18, 1915.

Application filed March 12, 1914. Serial No. 824,101.

*To all whom it may concern:*

Be it known that I, ERNEST A. LE BEAU, a citizen of the United States, residing at Chicago, Illinois, have invented a certain new and useful Improvement in Side Bearings for Railway-Cars, of which the following is a full, clear, and exact description, such as will enable others skilled in the art to which it appertains to make and use the same, reference being had to the accompanying drawings, forming part of this specification, in which—

Figure 1:
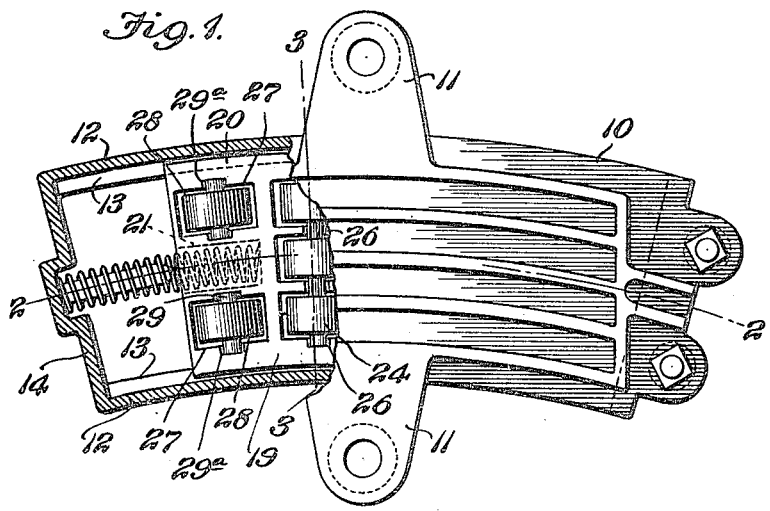
Figure 2:
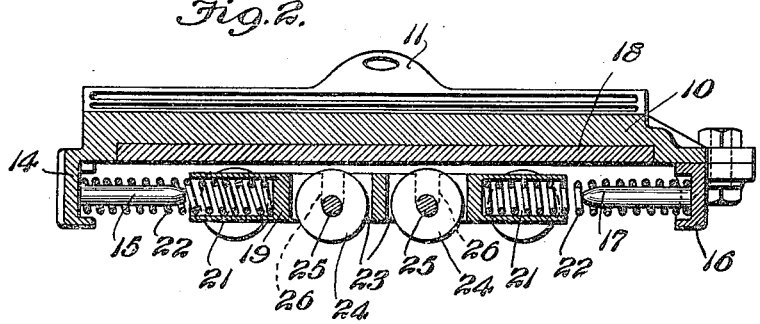
Figure 3:
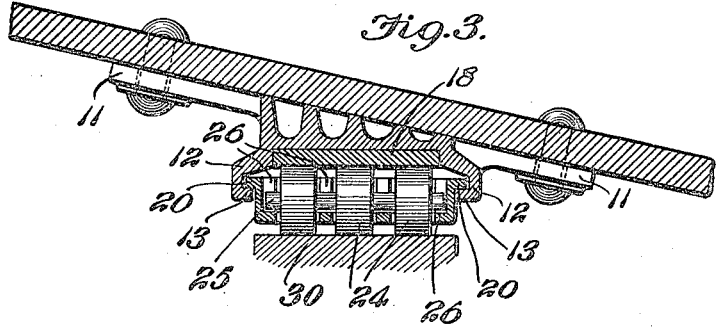

Figure 1 is a top plan view of a side bearing of my improved construction with a portion thereof in horizontal section. Fig. 2 is a section taken on the line 2—2 of Fig. 1. Fig. 3 is a section taken approximately on the line 3—3 of Fig. 1 and showing the side bearing in position on a body bolster.

My invention relates to new and useful improvements in anti-friction side bearings for railway cars, the principal object of my invention being to produce a comparatively simple and efficient self centering bearing, utilizing rollers as the anti-friction elements, and which bearing is of the inverted type, that is, it is applied to the body bolster instead of to the truck bolster, as is the case in a number of side bearings now in general use.

Further objects of my invention are, to arrange a roller carrying carriage in a suitable frame or base which is applied to the underside of the body bolster, which carriage in action moves in the arc of a circle having the king pin of the truck as an axis; and further to provide resilient means between the roller carriage and the frame or base for normally maintaining said carriage in a central position and restoring it to such central position after movement in either direction.

By providing an inverted side bearing or arranging the roller carrying carriage in a frame or base which is carried by the body bolster, the peripheries of the rollers are normally out of engagement with the bearing plates and any contact between said rollers and the bearing plates serves to revolve the rollers, thus eliminating the possibility of their wearing flat.

With the above and other objects in view, my invention consists in certain novel features of construction and arrangement of parts hereinafter more fully described and claimed.

In the construction of the device, as shown, 10 designates a base plate having ears 11, whereby it may be rigidly fixed to the body bolster, and formed integral with or fixed to the inner and outer edges of this plate are depending flanges 12 which terminate in inwardly projecting lips 13.

At one end of the base plate the depending flanges 12 are united by an integral wall 14, and fixed to the central portion thereof is an inwardly projecting pin 15 which serves as a support and centering member for one of the springs utilized between the base and the roller carriage.

At the opposite end of plate 10 a separate end wall 16 is provided, the same being positioned between the corresponding ends of the flanges 12 and fixed to the base plate 10 by means of bolts, rivets or like fastening devices.

Fixed to the central portion of this end wall 16 is an inwardly projecting pin which performs the same functions as the pin 15. Seated in the underside of the base plate 10 is a bearing plate 18 preferably of hardened metal.

The roller carriage forming a part of my improved side bearing comprises a plate 19 of such width as to operate freely between the depending flanges 12 at the sides of the base plate 10, and formed integral with the inner and outer edges of this plate 19 are outwardly projecting flanges 20 which overlie the inwardly projecting lips 13.

Formed in the ends of the plate 19 are pockets 21 and seated therein are the inner ends of compression springs 22, the outer portions of which are positioned on the pins 15 and 17. Formed in the central portion of the plate 19 are transverse rows of openings 23 and positioned therein are rollers 24, preferably of hardened metal, the same being mounted to rotate freely upon spindles 25, which latter are loosely mounted in slots or bearings 26 which are formed in the plate 19 to the sides of the openings 23.

Openings 27 are formed through the plate 19 to the sides of the pockets 21, and positioned in said openings are rollers 28 having spindles 29 which occupy bearings 29ª formed in the plate 19 to the sides of said openings 27. The depth of these slots or bearings is such that under normal conditions or when the load is not upon the bearing, the rollers occupy positions with their peripheries out of contact with the bearing plate 18.

The truck bolster is provided with a hardened metal bearing plate 30 which is adapted to contact with the surface of the antifriction rollers 24 and 28.

Under normal conditions the roller carriage comprising the plate 19 is maintained in a central position as shown in Figs. 1 and 2 by the springs 22, and with the spindles 25 and 29 in the lower ends of the bearings 26 and 29ª, the peripheries of the rollers 24 and 28 carried by said spindles are out of engagement with the bearing plate 18. (See Fig. 2.)

When the load is on the bearing, the peripheries of the rollers contact with both bearing plates 18 and 30, and as the truck bolster swings in either direction relative to the body bolster, the peripheries of the rollers ride upon the surfaces of said plates, and the roller carriage will be correspondingly shifted toward one end of the housing or base. This action necessarily compresses one of the springs 22, and as soon as the load is released the power stored in the compressed spring acts to instantly return the roller carriage to its normal central position, and the rollers will drop away from the upper bearing plate 18, for the reason that the spindles on which said rollers are mounted drop by gravity to the lower ends of their bearings.

The bearing rollers being normally out of contact with the bearing plates, are free to rotate in either direction as a result of vibration or by the slightest contact with either bearing plate, and therefore said rollers will not wear flat, which is frequently the result where the rollers are in constant engagement with one of the bearing plates.

A side bearing of my improved construction can be easily assembled or taken apart, is composed of a minimum number of parts, is very compact, and possesses superior advantages in point of simplicity, durability and general efficiency.

It will be readily understood that minor changes in the size, form and construction of the various parts of my improved side bearing may be made and substituted for those herein shown and described, without departing from the spirit of my invention, the scope of which is set forth in the appended claims.

I claim:

1. The combination with a body bolster, of a side bearing which is fixed to the underside of said body bolster and comprises a housing having side and end walls, a roller carriage arranged for operation within said housing, projections on the side walls of the housing for maintaining the carriage in operative position within said housing, said roller carriage being provided with pockets in its ends, pins projecting inwardly from the end walls of the housing, and compression springs positioned on said pins, the inner ends of which compression springs occupy the pockets in the ends of said roller carriage.

2. The combination with a body bolster, of a side bearing fixed to the underside of said body bolster and comprising a housing, a body bolster, of a roller carriage arranged for operation within said housing, and suspended therefrom, which carriage comprises a plate provided with openings, rollers arranged in said openings, spindles on which said rollers are mounted, and there being slotted bearings for said spindles formed in the plate to the sides of the roller openings, resilient means between the ends of the housing and the roller carriage for normally maintaining said carriage in a central position within the housing, and a hardened metal bearing plate seated in the upper portion of the housing, and with which the rollers of the roller carriage are adapted to engage.

3. The combination with a body bolster, of a side bearing the same being fixed to the underside of said body bolster and comprising a housing having side and end walls one of which is removable, a hardened metal bearing plate fixed to the underside of the top of said housing, a roller carriage arranged for operation within the housing, and suspended from the side walls thereof, which carriage comprises a plate provided with openings, rollers arranged in said openings, spindles on which said rollers are mounted, and there being slotted bearings for said spindles formed in the plate to the sides of the roller openings, the rollers of which carriage are adapted to engage with the bearing plate when the latter is on the bearing, and resilient means between the end walls of the housing and the roller carriage for normally holding said carriage in central position within the housing.

4. The combination with a body bolster, of a housing adapted to be fixed to the underside of said body bolster, said housing having side and end walls, one of which latter is removable, flanges projecting inwardly from the lower portions of the side walls of the housing, a hardened metal plate fixed to the underside of the top of said housing, a roller carriage arranged for operation within the housing, outwardly projecting flanges on the sides of said roller carriage, which flanges normally rest on the inwardly projecting flanges of the housing, said carriage being provided with a series of openings, rollers arranged in said openings, spindles on which said rollers are mounted, there being slotted bearings formed in the carriage to the sides of the openings therein for the spindles of the rollers, pins projecting inwardly from the ends of the housing, and compression springs arranged on said pins and engaging the ends of the roller carriage for normally maintaining the same in central position within the housing.

In testimony whereof I hereunto affix my signature in the presence of two witnesses, this sixth day of March, 1914.

ERNEST A. LE BEAU.

Witnesses:
 E. T. WALKER,
 M. P. SMITH.

Copies of this patent may be obtained for five cents each, by addressing the "Commissioner of Patents, Washington, D. C."